(12) United States Patent
Medoro et al.

(10) Patent No.: US 10,343,577 B1
(45) Date of Patent: Jul. 9, 2019

(54) 3-PIECE CUP HOLDER ASSEMBLY AND ARMREST ASSEMBLY INCORPORATING THAT CUP HOLDER ASSEMBLY

(71) Applicant: FORD GLOBAL TECHNOLOGIES, LLC, Dearborn, MI (US)

(72) Inventors: Michael Medoro, Livonia, MI (US); Chris Fredriksson, LaSalle (CA); Ranjit Nagi, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/851,131

(22) Filed: Dec. 21, 2017

(51) Int. Cl.
*B60N 2/75* (2018.01)
*B60N 3/10* (2006.01)

(52) U.S. Cl.
CPC .............. *B60N 3/108* (2013.01); *B60N 2/79* (2018.02); *B60N 2/757* (2018.02)

(58) Field of Classification Search
CPC ................................ B60N 3/102; B60N 3/101
USPC ............ 297/188.14, 188.16, 411.46, 452.38; 38/102.91; 160/380
See application file for complete search history.

(56) References Cited

U.S. PATENT DOCUMENTS

| | | | |
|---|---|---|---|
| 3,951,448 A | 4/1976 | Hawie | |
| 5,121,963 A * | 6/1992 | Kwasnik | B60N 2/793 297/227 |
| 5,275,779 A | 1/1994 | Marfilius et al. | |
| 7,585,021 B2 * | 9/2009 | Tabata | B29C 44/1257 297/188.14 |
| 8,678,460 B2 | 3/2014 | Stachura et al. | |
| 2004/0129747 A1 * | 7/2004 | Maierholzner | B60N 3/102 224/544 |
| 2010/0244507 A1 * | 9/2010 | Miyazaki | B60N 2/58 297/188.14 |
| 2013/0126691 A1 * | 5/2013 | Miklas | B60N 3/102 248/311.2 |
| 2018/0162251 A1 * | 6/2018 | Bohlke | B60N 2/757 |

FOREIGN PATENT DOCUMENTS

| | | |
|---|---|---|
| CN | 105235557 A | 1/2016 |
| DE | 102007045614 A1 | 4/2009 |
| DE | 102008058107 A1 | 5/2010 |
| JP | H09309370 A | 12/1997 |
| JP | 5687159 B2 | 3/2015 |

OTHER PUBLICATIONS

English Machine Translation of CN105235557A.
English Machine Translation of DE102007045614A1.
English Machine Translation of DE102008058107A1.
English Machine Translation of JP5687159B2.
English Machine Translation of JPH09309370A.

* cited by examiner

*Primary Examiner* — Joanne Silbermann
(74) *Attorney, Agent, or Firm* — Vichit Chea; King & Schickli, PLLC

(57) ABSTRACT

A cup holder assembly includes a bezel, a support ring and a cup holder body captured between the bezel and the support ring. An armrest assembly includes a support frame, a cushion, a trim cover and the cup holder assembly.

14 Claims, 4 Drawing Sheets

3-PIECE CUP HOLDER ASSEMBLY AND ARMREST ASSEMBLY INCORPORATING THAT CUP HOLDER ASSEMBLY

TECHNICAL FIELD

This document relates generally to the motor vehicle equipment field and, more particularly, to a new and improved cup holder assembly as well as to an armrest incorporating that cup holder assembly.

BACKGROUND

It is known in the art to provide a cup holder assembly in a rear seat center armrest of a motor vehicle. Typically, such a cup holder assembly is made from a hard plastic material. When the armrest is stowed and the center seat is occupied, the occupant can feel the hard plastic of the cup holder assembly against his or her back as a result of the relatively limited thickness of the foam cushion material under the cup holder. This makes the seat uncomfortable. The cup holder also restricts the penetration of the occupant in the center seat.

This document relates to a new and improved 3-piece cup holder assembly incorporating a bezel, a support ring and a cup holder body of soft shell construction captured between the bezel and the support ring. For purposes of this document, soft cell construction means the cup holder body is made from a soft material that is able to collapse when subjected to foreseeable pressure resulting from one sitting in the center seat position with one's back against the armrest oriented in the stowed position.

Advantageously, the cup holder assembly is inexpensive to produce, easily assembled and integrated into an armrest assembly and substantially increases the comfort of a center seat occupant when that occupant rests his or her back against the armrest incorporating the cup holder assembly.

SUMMARY

In accordance with the purposes and benefits described herein, a cup holder assembly is provided. That cup holder assembly comprises a body including a bezel, a support ring and a cup holder body. The cup holder body is captured between the bezel and the support ring.

The cup holder may be made from a flexible material which furnishes a soft shell construction allowing the cup holder body to collapse when the back of a center seat occupant presses against the armrest when that armrest is in the stowed position in a cavity in the center of the rear seat back. Thus, it should be appreciated that the cup holder body may be transformable between a cup holder configuration and then at least a partially collapsed configuration.

The cup holder assembly may further include a plurality of projecting fingers on the support ring. Further, the cup holder assembly may include a plurality of receivers in the cup holder body. Still further, the cup holder assembly may include at least one tab on the bezel. When assembled, the plurality of fingers extend through the plurality of receivers and are engaged by the at least one tab.

More specifically, the bezel of the cup holder assembly may have a first, L-shaped cross section. That first L-shaped cross section may include a first segment and a second segment. At least one tab may depend from the first segment.

In addition, the cup holder assembly may further include at least one dimple depending from the second segment. The trim cover of the armrest is captured between the at least one dimple and the cup holder body.

The cup holder body may further include a sidewall and an upper flange defining a corner received within the first L-shaped cross section between the at least one dimple and the at least one tab. Further, the support ring may include a second L-shaped cross section nested in the corner of the cup holder body.

In accordance with an additional aspect, an armrest assembly is provided. That armrest assembly comprises a support frame, a cushion and a trim cover as well as a cup holder assembly. The cup holder assembly is held in the cushion. Further, the cup holder assembly includes a bezel, a support ring and a cup holder body captured between the bezel and the support ring.

A margin of the trim cover is captured between the cup holder body and the bezel. The cup holder body may be made from a flexible material. Further, the cup holder body may be transformable between a cup holder configuration and an at least partially collapsed configuration.

A plurality of projecting fingers may be provided on the support ring. Further, a plurality of receivers may be provided on the cup holder body. In addition, at least one tab may be provided on the bezel. When the cup holder assembly is assembled, the plurality of fingers extend through the plurality of receivers and are engaged by the at least one tab.

In at least some of the many possible embodiments, the trim cover includes a plurality of apertures. When the cup holder assembly is integrated into the armrest assembly, the plurality of fingers may extend through the plurality of apertures.

In the following description, there are shown and described several preferred embodiments of the cup holder assembly and the armrest assembly that incorporates that cup holder assembly. As it should be realized, the cup holder assembly and the armrest assembly are capable of other, different embodiments and their several details are capable of modification in various, obvious aspects all without departing from the cup holder assembly and armrest assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cup holder assembly and the armrest assembly and together with the description serve to explain certain principles thereof.

Reference will now be made in detail to the present preferred embodiments of the cup holder assembly and the related armrest assembly, examples of which are illustrated in the accompanying drawing figures.

DETAILED DESCRIPTION

Figure 1:
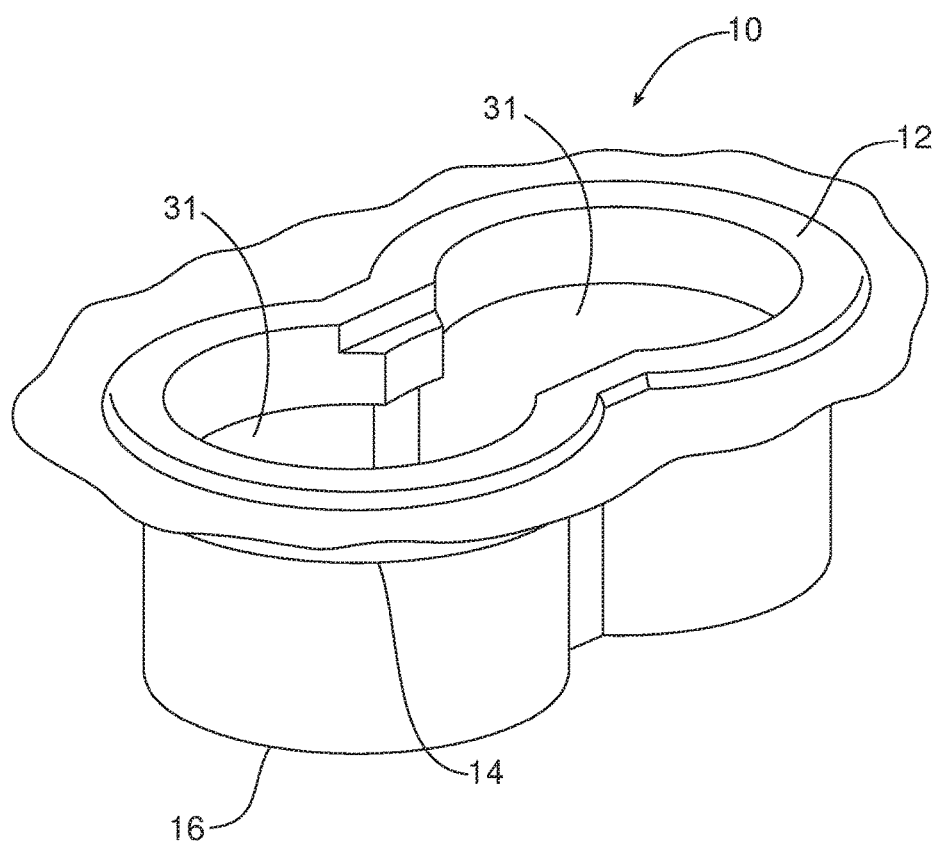
FIG. 1 is detailed perspective view of the cup holder assembly secured in an opening of a trim cover of an armrest assembly.
Figure 2:
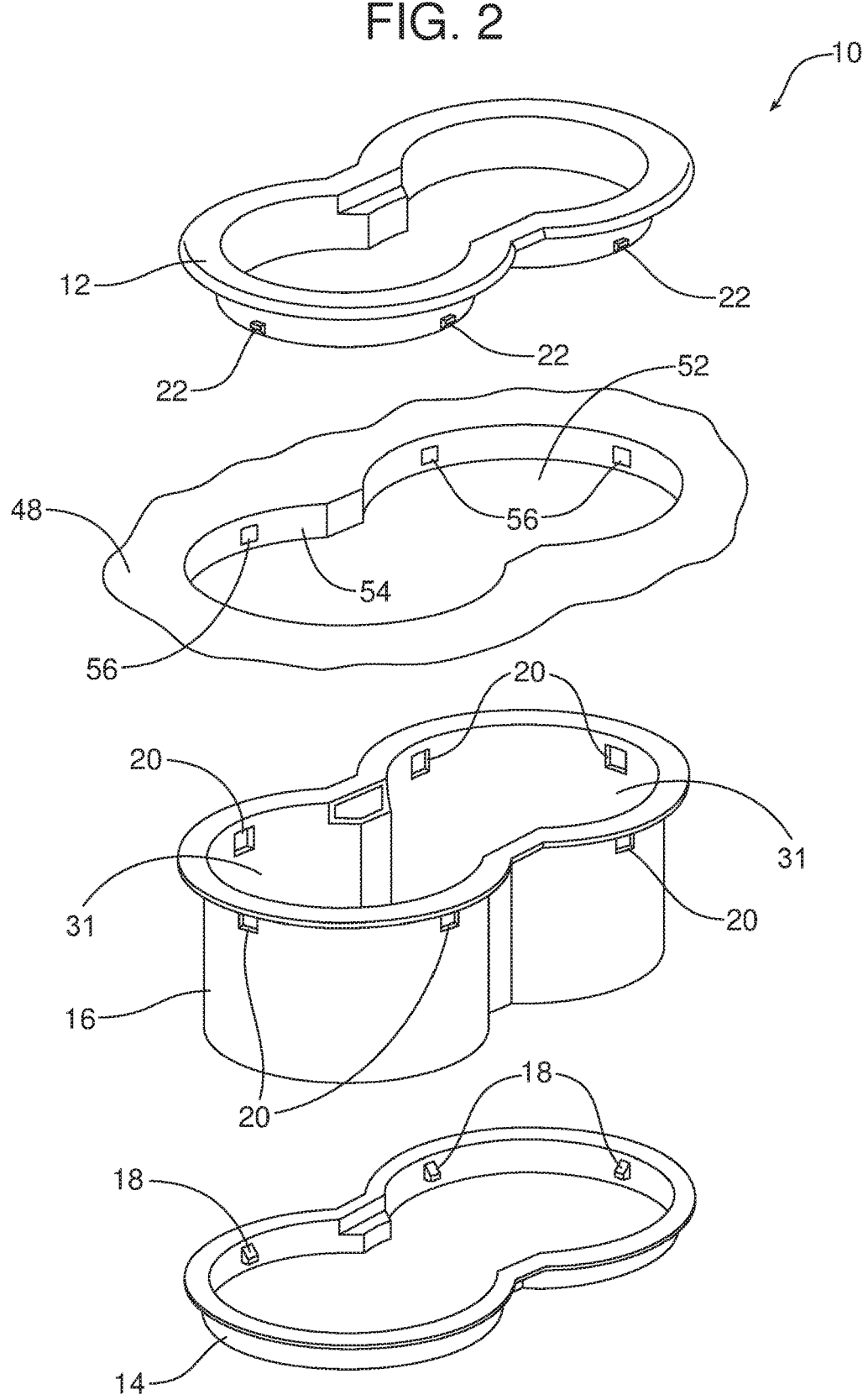
FIG. 2 is an exploded perspective view of the structure illustrated in FIG. 1.

Reference is now made to FIGS. 1 and 2 which illustrate the new and improved cup holder assembly 10. The cup holder assembly 10 includes three component parts: a bezel 12, a support ring 14 and a cup holder body 16 that is captured between the bezel and the support ring when the cup holder assembly is assembled. The bezel 12 and the support ring 14 may be made from relatively rigid materials such as polyoxymethylene (POM), acrylonitrile butadiene styrene (ABS), polypropylene (PP) or Nylon. In contrast, the cup holder body 16 has a soft shell construction. Thus, the cup holder body 16 is made from a flexible material such as silicone, thermoplastic elastomer or rubber that is transformable between a cup holder configuration illustrated in FIGS. 1 and 2 (note straight sidewalls 30 of cupwells 31) and an at least partially collapsed configuration illustrated in FIG. 4 (note wrinkled or partially collapsed sidewalls 30 of cupwells 31).

Figure 3:
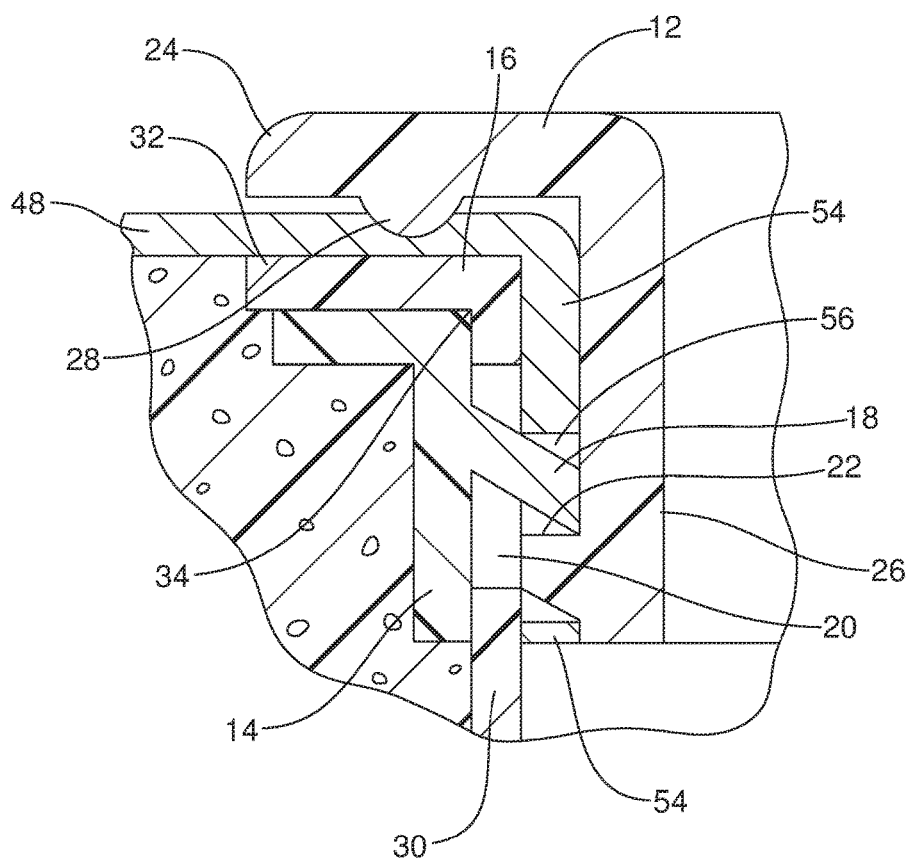
FIG. 3 is a detailed cross sectional view showing the interconnection of the three component parts of the cup holder assembly and the integration of the assembled cup holder assembly with the trim cover of an armrest assembly.

As should be appreciated from reviewing FIGS. 2 and 3, a plurality of projecting fingers 18 are provided at spaced locations along the support ring 14. A plurality of receivers 20 are provided at similarly spaced locations along the cup holder body 16. In addition, at least one tab 22 is provided on the bezel 12. In the illustrated embodiment, a plurality of tabs 22 are provided and spaced consistent with the projecting fingers 18 and the spaced receivers 20. Further, an equal number of projecting fingers 18, spaced receivers 20 and tabs 22 is provided.

As further illustrated in FIG. 3, the bezel 12 has a first L-shaped cross section including a first segment 26 and a second segment 24. The at least one tab 22 depends from the first segment 26. In addition, at least one dimple 28 depends from the second segment 24. In the illustrated embodiment, a plurality of dimples 28 are provided.

As further illustrated in FIGS. 2 and 3, the cup holder body 16 includes a sidewall 30 defining two cupwells 31, and an upper flange 32 defining a corner 34 received within the first L-shaped cross section of the bezel 12 between the dimple 28 and the tab 22. Further, the support ring 14 includes a second L-shaped cross section nested in the corner 34 of the cup holder body 16 when the cup holder assembly 10 is fully assembled as shown in FIGS. 1 and 3. When the cup holder assembly is fully assembled, it should also be appreciated that the cup holder body 16 is captured in a nested position between the bezel 12 and the support ring 14.

Figure 4:
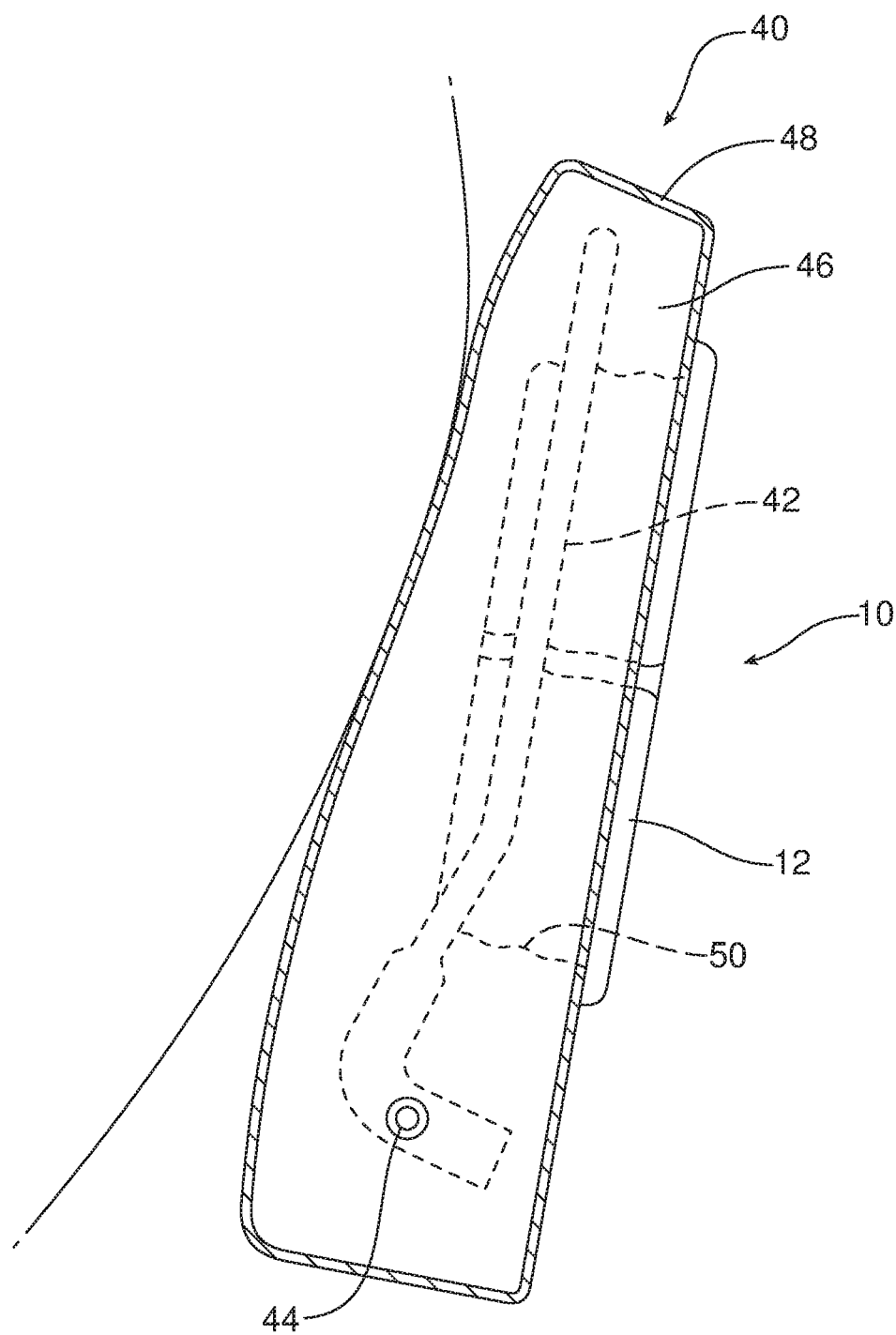
FIG. 4 illustrates how the cup holder body of the cup holder assembly collapses under the pressure of a center seat occupant's back when a center seat occupant leans against the cup holder assembly in the stowed position.

Reference is now made to FIG. 4 illustrating an armrest assembly 40. That armrest assembly 40 includes a support frame 42 that holds an axle 44 to allow for pivotal movement of the armrest assembly 40 between a stowed position in a cavity in the rear seat back (as depicted in FIG. 4) and a deployed position projecting forward from that cavity along the rear seat bottom in a manner known in the art. The armrest assembly 40 also includes a cushion 46 of cellular foam or other appropriate material extending around the support frame 42. A trim cover 48 overlies and envelopes the cushion 46. The trim cover 48 may be made from any appropriate and aesthetically pleasing material such as cloth, a microfiber material, leather or the like. The cup holder assembly 10, illustrated in detail in FIGS. 1-3 is held in a cavity or recess 50 in the cushion 46.

As illustrated in FIGS. 2 and 3, the trim cover 48 includes an opening 52 adapted to receive the cup holder assembly 10. A margin 54 of the trim cover 48 extending around the opening 52 includes a plurality of apertures 56 identical in spacing and in number to the projecting fingers 18 on the support ring 14, the receivers 20 in the cup holder body 16 and the tabs 22 on the bezel 12.

When the cup holder assembly 10 is assembled and integrated into the armrest assembly 40, the cup holder body 16 is inserted into the support ring 14 until the second L-shaped cross section of the support ring is nested in the corner 34 of the cup holder body 16 and the plurality of fingers 18 are received in and projecting through the plurality of receivers 20.

The assembled support ring 14 and cup holder body 16 are then inserted down into the cup holder receiving cavity 50 in the cushion 46.

Once the assembled support ring 14 and cup holder body 16 have been fully seated in the cavity 50, the margin 54 of the trim cover 48 is stretched over the upper flange 32 and around the outside of the corner 34 and then down along the sidewall 30. The apertures 56 in the margin 54 of the trim cover 48 are then aligned with the projecting fingers 18 and those fingers are inserted in the apertures.

Next, the bezel 12 is aligned with and inserted in the cup holder body 16. When fully seated, the tabs 22 on the bezel 12 snap past the resilient projecting fingers 18. This serves to hold the bezel 12 in the fully seated position. As should be appreciated from viewing FIG. 3, the cup holder assembly 10 is secured tightly to the margin 54 of the trim cover 48. More specifically, the apertures 56 receive both the projecting fingers 18 of the support ring 14 as well as the tabs 22 of the bezel 12 that pass through the apertures in the opposite direction to the projecting fingers. In addition, the margin 54 of the trim cover 48 is also captured at the spaced pressure points between the dimples 28 on the bezel 12 and the upper flange 32 of the cup holder body 16. Thus, it should be appreciated that the cup holder assembly 10 is securely attached to the armrest assembly 40 and held within the cushion 46 in the trim cover 48.

It should be appreciated that the cup holder assembly 10 and the armrest assembly 40 provide a number of benefits and advantages. The soft shell construction of the cup holder body 16 allows that body to collapse so that a seat occupant does not feel any hard plastic cup holder body behind his or her back. This improves seating comfort. In addition, the cup holder body 16 collapse improves the occupant penetration in the armrest assembly 40 when in stowed position during the event of a collision.

The decorative bezel 12 allows for styling flexibility and an improved aesthetic appearance.

The cup holder body 16 is not attached to the support frame 42 of the armrest assembly 40. Rather, it is attached to the trim cover 48 and allowed to float in the cavity 50 in the armrest cushion 46. This reduces the cost, weight, part count and risk of rattle over hard shell cup holders of the prior art.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:
1. A cup holder assembly, comprising:
   a bezel including at least one tab;

a support ring including a plurality of projecting fingers; and a cup holder body captured between said bezel and said support ring, said cup holder body including a plurality of receivers, wherein said plurality of fingers extend through said plurality of receivers and are engaged by said at least one tab.

2. The cup holder assembly of claim 1, wherein said cup holder body is made from a flexible material.

3. The cup holder assembly of claim 2, wherein said cup holder body is transformable between a cup holder configuration and an at least partially collapsed configuration.

4. The cup holder assembly of claim 3, wherein said bezel has a first L-shaped cross-section.

5. The cup holder assembly of claim 4, wherein said first L-shaped cross-section includes a first segment and a second segment.

6. The cup holder assembly of claim 5, wherein said at least one tab depends from said first segment.

7. The cup holder assembly of claim 6, further including at least one dimple depending from said second segment whereby a trim cover of an armrest assembly is captured between said at least one dimple and said cup holder body.

8. The cup holder assembly of claim 7, wherein said cup holder body includes a sidewall and an upper flange defining a corner received within said first L-shaped cross-section between said at least one dimple and said at least one tab.

9. The cup holder assembly of claim 8, wherein said support ring includes a second L-shaped cross-section nested in said corner of said cup holder body.

10. An armrest assembly, comprising:

a support frame, a cushion and a trim cover; and a cup holder assembly held in said cushion, said cup holder assembly including a bezel having at least one tab, a support ring having a plurality of projecting fingers and a cup holder body having a plurality of receivers, said cup holder body captured between said bezel and said support ring, wherein said plurality of projecting fingers extend through said plurality of receivers and are engaged by said at least one tab.

11. The armrest assembly of claim 10, wherein a margin of said trim cover is captured between said cup holder body and said bezel.

12. The armrest assembly claim 11, wherein said cup holder body is made from a flexible material.

13. The armrest assembly of claim 12, wherein said cup holder body is transformable between a cup holder configuration and an at least partially collapsed configuration.

14. The armrest assembly of claim 13, wherein said trim cover includes a plurality of apertures and said plurality of projecting fingers extend through said plurality of apertures.

\* \* \* \* \*